(12) United States Patent
Wang et al.

(10) Patent No.: US 11,726,208 B2
(45) Date of Patent: Aug. 15, 2023

(54) AUTONOMOUS VEHICLE LOCALIZATION USING A LIDAR INTENSITY MAP

(71) Applicant: UATC, LLC, San Francisco, CA (US)

(72) Inventors: Shenlong Wang, Toronto (CA); Andrei Pokrovsky, San Francisco, CA (US); Raquel Urtasun Sotil, Toronto (CA); Ioan Andrei Bârsan, Toronto (CA)

(73) Assignee: UATC, LLC, San Francisco, CA (US)

( * ) Notice: Subject to any disclaimer, the term of this patent is extended or adjusted under 35 U.S.C. 154(b) by 489 days.

(21) Appl. No.: 16/437,827

(22) Filed: Jun. 11, 2019

(65) Prior Publication Data

US 2019/0383945 A1    Dec. 19, 2019

Related U.S. Application Data

(60) Provisional application No. 62/685,875, filed on Jun. 15, 2018.

(51) Int. Cl.
| | |
|---|---|
| *G01S 17/42* | (2006.01) |
| *G01S 7/4861* | (2020.01) |
| *G05D 1/00* | (2006.01) |
| *G01S 19/51* | (2010.01) |
| *G05D 1/02* | (2020.01) |
| *G01S 17/931* | (2020.01) |

(52) U.S. Cl.
CPC ............ *G01S 17/42* (2013.01); *G01S 7/4861* (2013.01); *G01S 17/931* (2020.01); *G01S 19/51* (2013.01); *G05D 1/0088* (2013.01); *G05D 1/024* (2013.01)

(58) Field of Classification Search
None
See application file for complete search history.

(56) References Cited

U.S. PATENT DOCUMENTS

| | | | | |
|---|---|---|---|---|
| 10,024,664 | B1* | 7/2018 | Gill | G06T 3/00 |
| 10,269,257 | B1* | 4/2019 | Gohl | G05D 1/106 |
| 2008/0033645 | A1* | 2/2008 | Levinson | G01S 19/49 |
| | | | | 701/469 |
| 2019/0080467 | A1* | 3/2019 | Hirzer | G06T 7/73 |
| 2019/0331497 | A1* | 10/2019 | Vora | G01S 17/86 |

* cited by examiner

*Primary Examiner* — Hovhannes Baghdasaryan
(74) *Attorney, Agent, or Firm* — Schwegman Lundberg & Woessner, P.A.

(57) ABSTRACT

Aspects of the present disclosure involve systems, methods, and devices for autonomous vehicle localization using a Lidar intensity map. A system is configured to generate a map embedding using a first neural network and to generate an online Lidar intensity embedding using a second neural network. The map embedding is based on input map data comprising a Lidar intensity map, and the Lidar sweep embedding is based on online Lidar sweep data. The system is further configured to generate multiple pose candidates based on the online Lidar intensity embedding and compute a three-dimensional (3D) score map comprising a match score for each pose candidate that indicates a similarity between the pose candidate and the map embedding. The system is further configured to determine a pose of a vehicle based on the 3D score map and to control one or more operations of the vehicle based on the determined pose.

20 Claims, 5 Drawing Sheets

AUTONOMOUS VEHICLE LOCALIZATION USING A LIDAR INTENSITY MAP

CLAIM FOR PRIORITY

This application claims the benefit of priority to U.S. Provisional Application Ser. No. 62/685,875, filed Jun. 15, 2018, which is hereby incorporated by reference in its entirety.

TECHNICAL FIELD

The subject matter disclosed herein relates to autonomous vehicle (AV) systems. In particular, example embodiments relate to localization of AV systems using a Lidar intensity map.

BACKGROUND

Lidar is a RADAR-like system that uses lasers to create three-dimensional representations of surrounding environments. A Lidar unit includes at least one emitter paired with a receiver to form a channel, though an array of channels may be used to expand the field of view of the Lidar unit. During operation, each channel emits a light signal into the environment that is reflected off of the surrounding environment back to the receiver. A single channel provides a single point of ranging information. Collectively, channels are combined to create a point cloud that corresponds to a three-dimensional representation of the surrounding environment. The Lidar unit also includes circuitry to measure the time of flight (ToF)—i.e., the elapsed time from emitting the light signal to detecting the return signal. The time of flight is used to determine the distance of the Lidar unit to the detected object.

Increasingly, Lidar is finding applications in autonomous vehicles (AVs) such as partially or fully autonomous cars. One of the fundamental problems in AV operation is accurate localization of the vehicle in real time. Different precision requirements exist depending on how the localization system is intended to be used. For routing an AV from point A to point B, precision of a few meters is sufficient. However, centimeter-level localization becomes necessary in order to exploit high definition (HD) maps as priors for robust perception, prediction and safe motion planning. Centimeter-level localization is also critical to the safe operation of an autonomous vehicle.

Accurate localization remains an open problem in the realm of AVs, especially when very low latency is required. Geometric methods, such as those based on the iterative closest-point (ICP) family of algorithms, can lead to high-precision localization, but remain limited in the presence of geometrically non-distinctive or repetitive environments, such as tunnels, highways, or bridges. Image-based methods are also capable of robust localization, but are still behind geometric ones in terms of localization precision. Furthermore, image-based methods require capturing the environment in different seasons and times of the day as the appearance might change dramatically.

An alternative to the above referenced localization techniques is to leverage Lidar intensity maps that encode information about the appearance and semantics of the scene. However, the intensity of commercial Lidar systems is inconsistent across manufactures, models, units, and even channels within a single unit. Further, the intensity returns of Lidar systems are prone to changes due to environmental factors such as temperature. Therefore, intensity-based localization methods rely heavily on having very accurate intensity calibration of each Lidar unit. This requires careful fine-tuning of each vehicle to achieve good performance, sometimes on a daily basis. Calibration can be a very laborious process, preventing this solution from being used in practice. Online calibration is a promising solution, but current approaches fail to deliver the desirable accuracy. Furthermore, maps have to be re-captured each time a sensor is changed (e.g., to replace old sensors with next-generation sensors).

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure address the forgoing issues with conventional vehicle localization techniques by providing a localization system that performs vehicle localization using Lidar intensity maps using a technique that does not rely upon complicated techniques for calibrating Lidar intensity returns. Instead, the localization system uses a deep neural network that embeds both Lidar intensity maps and online Lidar sweeps in a common space where calibration is not required. In performing the vehicle localization, the localization system searches exhaustively over three-dimensional (3D) pose candidates (e.g., positions in the map manifold and rotation), and scores each pose by computing a dot product between the Lidar intensity map and online Lidar sweep embeddings.

Through utilization of this approach, the localization system provides an improved localization process that may be particularly suited for Graphics Processing Unit (GPU) implementations. Contrary to conventional techniques that are not effective in environments that are geometrically non-distinctive or repetitive, the approach employed by the localization system is effective across both highway and urban environments regardless of geometric non-distinctiveness or repetitiveness of the surroundings. This approach provides additional benefits over conventional methods such as the ability to work with uncalibrated data, the ability to generalize across different Lidar sensors, and enhanced robustness with respect to dynamic objects.

Figure 1:
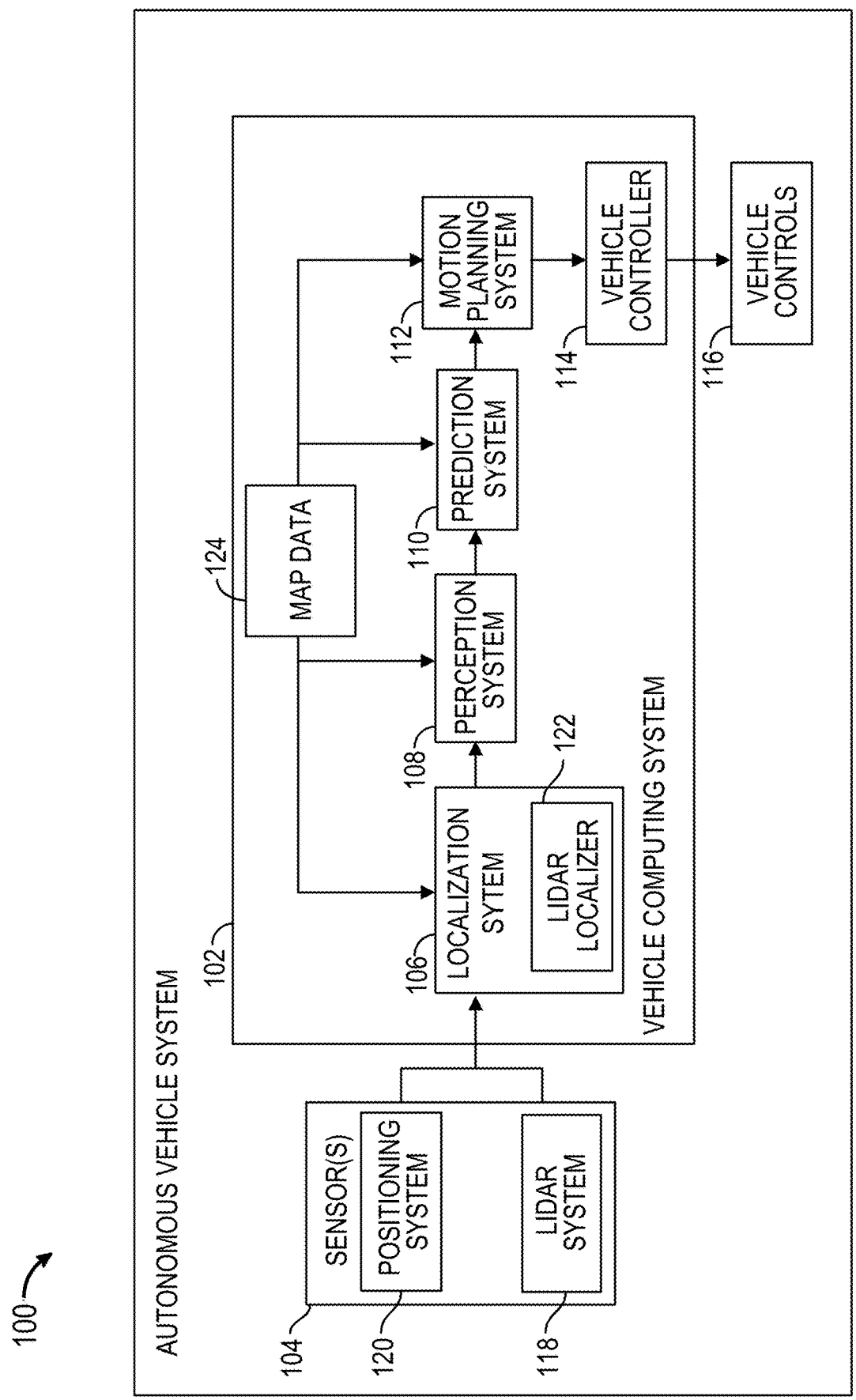
FIG. 1 is a block diagram illustrating an example autonomous vehicle (AV) system, according to some embodiments.

With reference to FIG. 1, an example autonomous vehicle (AV) system 100 is illustrated, according to some embodiments. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the AV system 100 to facilitate additional functionality that is not specifically described herein.

The AV system 100 is responsible for controlling a vehicle. The AV system 100 is capable of sensing its environment and navigating without human input. The AV system 100 can include a ground-based autonomous vehicle (e.g., car, truck, bus, etc.), an air-based autonomous vehicle (e.g., airplane, drone, helicopter, or other aircraft), or other types of vehicles (e.g., watercraft).

The AV system 100 includes a vehicle computing system 102, one or more sensors 104, and one or more vehicle controls 116. The vehicle computing system 102 can assist in controlling the AV system 100. In particular, the vehicle computing system 102 can receive sensor data from the one or more sensors 104, attempt to comprehend the surrounding environment by performing various processing techniques on data collected by the sensors 104, and generate an appropriate motion path through such surrounding environment. The vehicle computing system 102 can control the one or more vehicle controls 116 to operate the AV system 100 according to the motion path.

As illustrated in FIG. 1, the vehicle computing system 102 can include one or more computing devices that assist in controlling the AV system 100. Vehicle computing system 102 can include a localization system 106, a perception system 108, a prediction system 110, and a motion planning system 112 that cooperate to perceive the dynamic surrounding environment of the AV system 100 and determine a trajectory describing a proposed motion path for the AV system 100. Vehicle computing system 102 can additionally include a vehicle controller 114 configured to control the one or more vehicle controls 116 (e.g., actuators that control gas flow (propulsion), steering, braking, etc.) to execute the motion of the AV system 100 to follow the trajectory.

In particular, in some implementations, any one of the localization system 106, the perception system 108, the prediction system 110, or the motion planning system 112 can receive sensor data from the one or more sensors 104 that are coupled to or otherwise included within the AV system 100. As examples, the one or more sensors 104 can include a Lidar system 118, a Radio Detection and Ranging (RADAR) system, one or more cameras (e.g., visible spectrum cameras, infrared cameras, etc.), and/or other sensors. The sensor data can include information that describes the location of objects within the surrounding environment of the AV system 100.

As one example, for the Lidar system 118, the sensor data can include point data that includes the location (e.g., in three-dimensional space relative to the Lidar system 118) of a number of points that correspond to objects that have reflected an emitted light. For example, Lidar system 118 can measure distances by measuring the ToF that it takes a short light pulse to travel from the sensor(s) 104 to an object and back, calculating the distance from the known speed of light. The point data further includes an intensity value for each point that can provide information about the reflectiveness of the objects that have reflected an emitted light.

As another example, for RADAR systems, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for cameras, various processing techniques (e.g., range imaging techniques such as, for example, structure from motion, structured light, stereo triangulation, and/or other techniques) can be performed to identify the location (e.g., in three-dimensional space relative to a camera) of a number of points that correspond to objects that are depicted in imagery captured by the camera. Other sensor systems can identify the location of points that correspond to objects as well.

As another example, the one or more sensors 104 can include a positioning system 120. The positioning system 120 can determine a current position of the AV system 100. The positioning system 120 can be any device or circuitry for analyzing the position of the AV system 100. For example, the positioning system 120 can determine position by using one or more of inertial sensors; a satellite positioning system, based on Internet Protocol (IP) address, by using triangulation and/or proximity to network access points or other network components (e.g., cellular towers, WiFi access points, etc.); and/or other suitable techniques. The position of the AV system 100 can be used by various systems of the vehicle computing system 102.

Thus, the one or more sensors 104 can be used to collect sensor data that includes information that describes the location (e.g., in three-dimensional space relative to the AV system 100) of points that correspond to objects within the surrounding environment of the AV system 100.

In addition to the sensor data, the localization system 106, perception system 108, prediction system 110, and/or the motion planning system 112 can retrieve or otherwise obtain map data 124 that provides detailed information about the surrounding environment of the AV system 100. The map data 124 can provide information regarding: the identity and location of different travelways (e.g., roadways, alleyways, trails, and other paths designated for travel), road segments, buildings, or other items or objects (e.g., lampposts, crosswalks, curbing, etc.); known reflectiveness (e.g., radiance) of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data 124 that provides information that assists the vehicle computing system 102 in comprehending and perceiving its surrounding environment and its relationship thereto.

In addition, according to an aspect of the present disclosure, the map data 124 can include information that describes a significant number of nominal pathways through the world. As an example, in some instances, nominal pathways can generally correspond to common patterns of vehicle travel along one or more lanes (e.g., lanes on a roadway or other travelway). For example, a nominal pathway through a lane can generally correspond to a center line of such lane.

The map data 124 may also include one or more Lidar intensity maps constructed using Lidar point data (e.g., output by one or more Lidar systems). More specifically, a Lidar intensity map may include a bird's-eye view (BEV) map image encoded with Lidar intensity data that includes information about the appearance and semantics of the scene. Additionally, the Lidar intensity map may include a height map containing the height of each point in the intensity image with respect to some coordinate frame.

The localization system 106 receives the map data 124 and some or all of the sensor data from sensors 104 and generates vehicle poses for the AV system 100. A vehicle pose describes the position and attitude of the vehicle. The position of the AV system 100 is a point in a three-dimensional space. In some examples, the position is described by values for a set of Cartesian coordinates, although any other suitable coordinate system may be used. The attitude of the AV system 100 generally describes the way in which the AV system 100 is oriented at its position. In some examples, attitude is described by a yaw about the vertical axis, a pitch about a first horizontal axis, and a roll about a second horizontal axis. In some examples, the localization system 106 generates vehicle poses periodically (e.g., every second, every half second, etc.). The localization system 106 appends time stamps to vehicle poses, where the time stamp for a pose indicates the point in time that is described by the pose. The localization system 106 generates vehicle poses by comparing sensor data (e.g., remote sensor data) to map data 124 describing the surrounding environment of the AV system 100.

In some examples, the localization system 106 includes one or more localizers and a pose filter. Localizers generate pose estimates by comparing remote sensor data (e.g., Lidar, RADAR, etc.) to map data 124. As an example, as shown, the localization system 106 includes a Lidar localizer 122 that is configured to generate pose estimates based on a comparison of Lidar intensity maps with Lidar point data. Further details regarding the Lidar localizer 122 are discussed below in reference to FIGS. 3-5. A pose filter receives pose estimates from the one or more localizers as well as other sensor data such as, for example, motion sensor data from an inertial measurement unit (IMU), encoder, odometer, and the like. In some examples, the pose filter executes a Kalman filter or other statistical algorithm to combine pose estimates from the one or more localizers with motion sensor data to generate vehicle poses.

The perception system 108 can identify one or more objects that are proximate to the AV system 100 based on sensor data received from the one or more sensors 104 and/or the map data 124. In particular, in some implementations, the perception system 108 can determine, for each object, state data that describes a current state of such objects. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; specular or diffuse reflectivity characteristics; and/or other state information.

In some implementations, the perception system 108 can determine state data for each object over a number of iterations. In particular, the perception system 108 can update the state data for each object at each iteration. Thus, the perception system 108 can detect and track objects (e.g., vehicles) that are proximate to the AV system 100 over time.

The prediction system 110 can receive the state data from the perception system 108 and predict one or more future locations for each object based on such state data. For example, the prediction system 110 can predict where each object will be located within the next 5 seconds, 10 seconds, 20 seconds, and so forth. As one example, an object can be predicted to adhere to its current trajectory according to its current speed. As another example, other, more sophisticated prediction techniques or modeling can be used.

The motion planning system 112 can determine a motion plan for the AV system 100 based at least in part on the predicted one or more future locations for the object provided by the prediction system 110 and/or the state data for the object provided by the perception system 108. Stated differently, given information about the current locations of objects and/or predicted future locations of proximate objects, the motion planning system 112 can determine a motion plan for the AV system 100 that best navigates the AV system 100 relative to the objects at such locations.

The motion plan can be provided from the motion planning system 112 to a vehicle controller 114. In some implementations, the vehicle controller 114 can be a linear controller that may not have the same level of information about the environment and obstacles around the desired path of movement as is available in other computing system components (e.g., the perception system 108, prediction system 110, motion planning system 112, etc.). Nonetheless, the vehicle controller 114 can function to keep the AV system 100 reasonably close to the motion plan.

More particularly, the vehicle controller 114 can be configured to control motion of the AV system 100 to follow the motion plan. The vehicle controller 114 can control one or more of propulsion and braking of the AV system 100 to follow the motion plan. The vehicle controller 114 can also control steering of the AV system 100 to follow the motion plan. In some implementations, the vehicle controller 114 can be configured to generate one or more vehicle actuator commands and to further control one or more vehicle actuators provided within vehicle controls 116 in accordance with the vehicle actuator command(s). Vehicle actuators within vehicle controls 116 can include, for example, a steering actuator, a braking actuator, and/or a propulsion actuator.

Each of the localization system 106, the perception system 108, the prediction system 110, the motion planning system 112, and the vehicle controller 114 can include computer logic utilized to provide desired functionality. In some implementations, each of the localization system 106, the perception system 108, the prediction system 110, the motion planning system 112, and the vehicle controller 114 can be implemented in hardware, firmware, and/or software controlling a general-purpose processor. For example, in some implementations, each of the localization system 106, the perception system 108, the prediction system 110, the motion planning system 112, and the vehicle controller 114 includes program files stored on a storage device, loaded into a memory and executed by one or more processors. In other implementations, each of the localization system 106, the perception system 108, the prediction system 110, the motion planning system 112, and the vehicle controller 114 includes one or more sets of computer-executable instructions that are stored in a tangible computer-readable storage medium such as RAM, hard disk, or optical or magnetic media.

Figure 2:
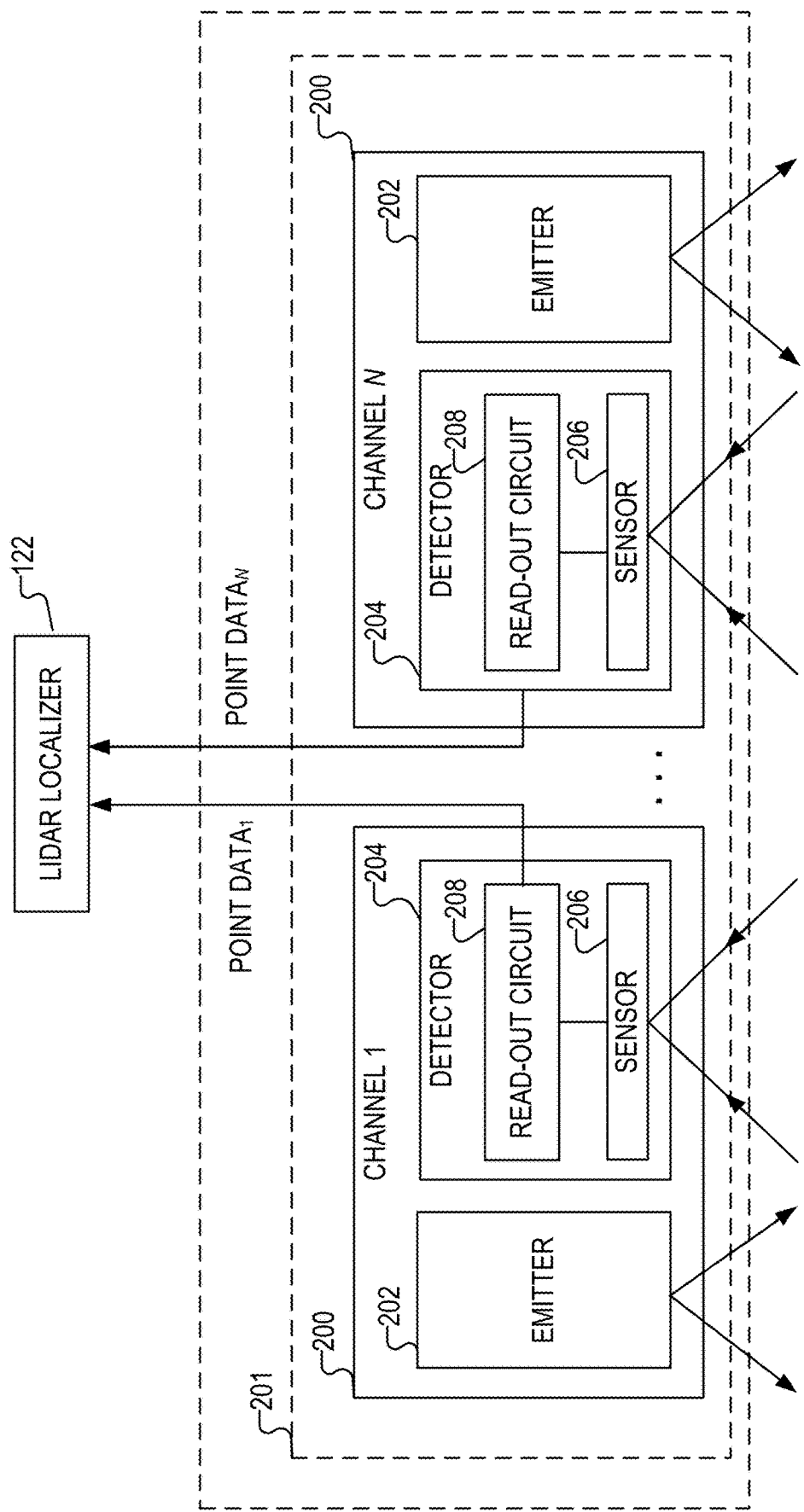
FIG. 2 is block diagram illustrating a Lidar system, which may be included as part of the AV system illustrated in FIG. 1, according to some embodiments.

FIG. 2 is block diagram illustrating the Lidar system 118, which may be included as part of the AV system 100, according to some embodiments. To avoid obscuring the inventive subject matter with unnecessary detail, various functional components that are not germane to conveying an understanding of the inventive subject matter have been omitted from FIG. 2. However, a skilled artisan will readily recognize that various additional functional components may be included as part of the Lidar system 118 to facilitate additional functionality that is not specifically described herein.

As shown, the Lidar system 118 comprises channels 200-0 to 200-N. The channels 200-0 to 200-N collectively form an array of channels 201. Individually, each of the channels 200-0 to 200-N outputs point data that provides a single point of ranging information. During operation of the Lidar system 118, the array of channels 201 rotates around a central axis of the Lidar system 118. As the array of channels 201 rotates around the central axis, each of the channels 200-0 to 200-N emits light signals into the surrounding environment and receives return signals. A single rotation of the array of channels 201 may be referred to herein as a "sweep." At each sweep, the point data output by each of the channels 200-0 to 200-N (i.e., point data$_{1-N}$) is combined to create a point cloud that corresponds to a three-dimensional representation of the surrounding environment.

Each the channels 200-0 to 200-N comprises an emitter 202 paired with a detector 204. The emitter 202 emits a light signal (e.g., a laser signal) into the environment that is reflected off the surrounding environment and returned back to a sensor 206 (e.g., an optical detector) in the detector 204. The signal that is reflected back to the sensor 206 is referred to as a "return signal." The sensor 206 provides the return signal to a read-out circuit 208 and the read-out circuit 208, in turn, outputs the point data based on the return signal. The point data comprises a distance value and an intensity value. The distance value corresponds to a distance of the Lidar system 118 from a detected surface (e.g., a road) that is determined by the read-out circuit 208 by measuring the ToF, which is the elapsed time between the emitter 202 emitting the light signal and the detector 204 detecting the return signal. To this end, the read-out circuit 208 includes timing circuitry to precisely and accurately measure the ToF. The intensity value is a measure of an intensity of the return signal, which can provide additional information about the surrounding environment such as reflective properties of objects.

As shown, the point data output by the channels 200-0 to 200-N is provided to the Lidar localizer 122 for use in Lidar-based localization processes. As will be discussed in further detail below, the Lidar localizer 122 compares the point data received from the channels 200-0 to 200-N with pre-constructed Lidar intensity maps to estimate poses of the AV system 100. Although FIG. 2 illustrates the point data being provided to only the Lidar localizer 122, it shall be appreciated that the point data may also be accessed by other components of the localization system 106 as well as other components of the AV system 100.

Figure 3:
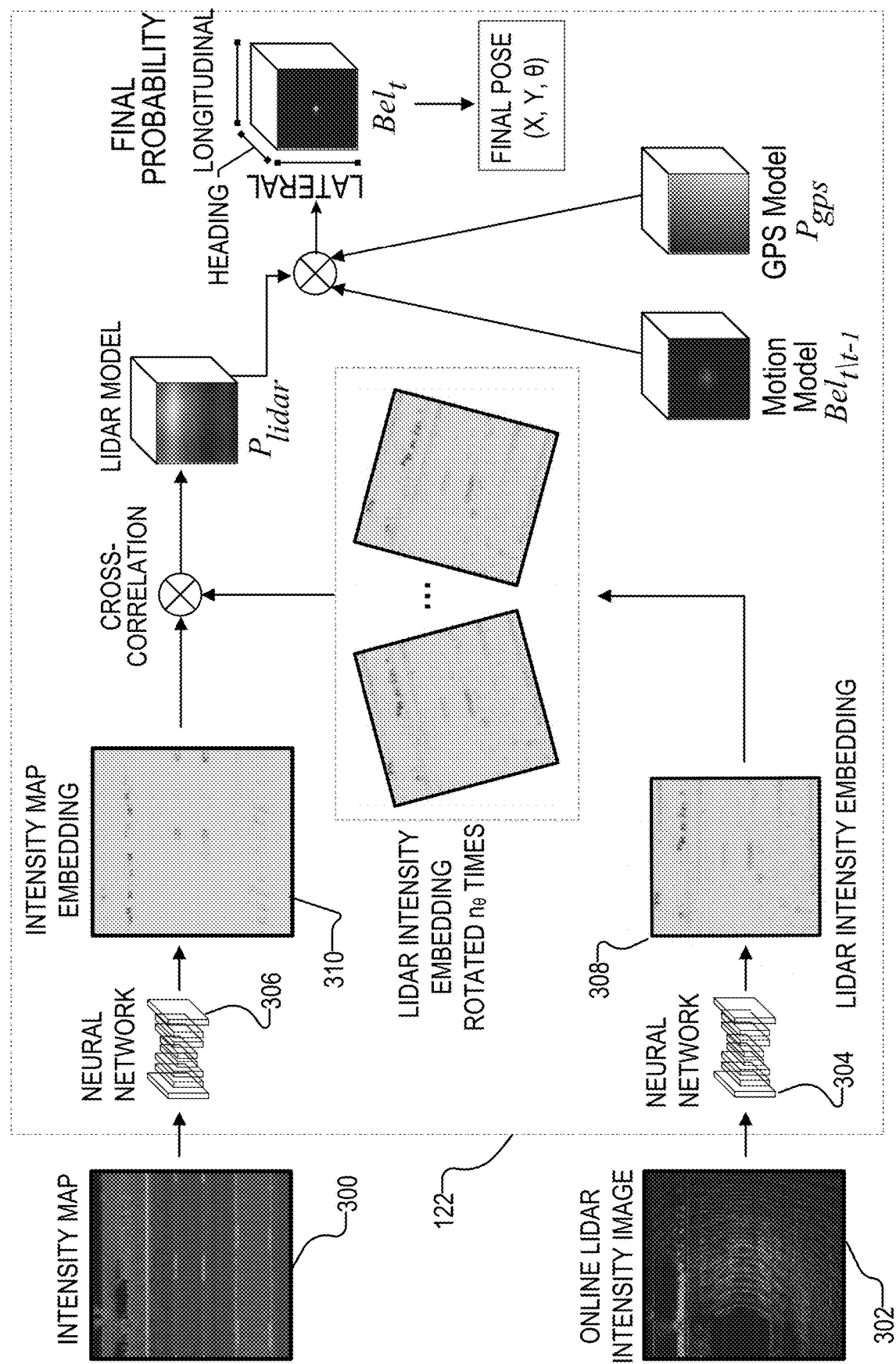
FIG. 3 is a diagram illustrating a data pipeline of a localization system, which is included as part of the AV system illustrated in FIG. 1, according to some embodiments.

FIG. 3 is a diagram illustrating a data pipeline of the Lidar localizer 122, according to some embodiments. The Lidar localizer 122 performs high-precision localization against pre-constructed Lidar intensity maps. For the purposes of the following explanation, let x be the pose of the AV system 100. Assuming that the sensors of the AV system 100 are calibrated and neglecting the effects of suspension, unbalanced tires, and vibration on the AV system 100, the pose of the AV system 100 may be simplified as a 3-degrees-of-freedom (3-DoF) pose (e.g., rather than a 6-DoF pose). More specifically, the pose of the AV system 100 may be simplified as a 2D translation and a heading angle (i.e., $x=\{x, y, \theta\}$, where $x, y \in R$ and $\theta \in (-\pi, \pi])$). At each time step t, the Lidar localizer 122 takes as input the maximum likelihood estimate of the previous vehicle pose $x^*_{t-1}$, the previous belief map $\text{Bel}_{t-1}$ propagated to the current time as $\text{Bel}_{t|t-1}$ using the vehicle dynamics, $\dot{x}_t$, an online Lidar intensity image 302, and a pre-constructed Lidar intensity map 300.

The Lidar intensity map 300 is constructed using Lidar point data (e.g., output by one or more Lidar systems) from multiple passes through the same area, which allows for additional processing, such as dynamic object removal. The accumulation of multiple passes also produces maps that are much denser than individual Lidar sweeps. The Lidar intensity map 300 is encoded as orthographic bird's-eye view (BEV) image of the ground.

The online Lidar intensity image 302 comprises Lidar point data that includes Lidar point clouds from the k most recent Lidar sweeps. The online Lidar intensity image 302 comprises a BEV rasterized image generated by aggregating the k most recent Lidar sweeps using IMU and wheel odometry information. The aggregation of point clouds from multiple sweeps produces denser online Lidar images than using only the most recent sweep, which in turn improves localization.

In performing the localization of the AV system 100, the Lidar localizer 122 treats localization as a recursive Bayesian inference problem encoding the fact that the online Lidar sweep data should be consistent with the input map data at the vehicle's location, and the belief updates should be consistent with the motion model. Thus, the localization problem may be formulated as follows:

$$\text{Bel}_t(x) = \eta P_{Lidar}(I_t|x;M;w) P_{GPS}(G_t|x) \text{Bel}_{t|t-1}(x|X_t)$$

where $I_t$ is the online Lidar intensity image 302, M is the Lidar intensity map 300, $G_t$ is the GPS observation, $X_t$ is the dynamics observation, w is a set of learnable parameters, and $x^*_t = \text{argmin}_x \text{Bel}_t(x)$. Given a candidate pose x, the Lidar matching probability function $P_{LiDAR}$ encodes an agreement between the current online Lidar observation and the map indexed at the hypothesized pose x. To compute the probability function, the Lidar localizer 122 projects both the map M and the online Lidar intensity image I into an embedding space using two embedding functions. The Lidar localizer 122 then warps the online embedding according to a particular pose hypothesis, and computes a cross-correlation between the warped online embedding and the map embedding. Formally, this can be written as follows:

$$P_{LiDAR} \propto s(\pi(f(I; w_O), x), g(M; w_M))$$

where $f(I; w_O)$ represents a deep embedding of the online Lidar intensity image 302 (i.e., online Lidar intensity embedding 308), and $g(M; w_M)$ represents a deep embedding of the Lidar intensity map 300 (i.e., intensity map embedding 310). Terms $w_o$ and $w_m$ are the networks' parameters and a represents a 2D rigid warping function meant to transform the online Lidar intensity embedding 308 into the coordinate frame of the intensity map embedding 310 according to the given pose hypothesis x. Finally, s represents a cross-correlation operation. Consistent with some embodiments, the embedding functions $f(\cdot; w_O)$ and $g(\cdot; w_M)$ can be customized, fully convolutional neural networks. Accordingly, in the context of FIG. 3, the embedding function $f(\bullet; w_O)$ is represented by a neural network 304 and the embedding function $g(\bullet; w_M)$ is represented as neural network 306. The first embedding function $f(\bullet; w_O)$ takes as input the online Lidar intensity image 302 and produces online Lidar intensity embedding 308 comprising a dense single- or multi-channel representation of the online Lidar intensity image 302 at the same resolution as the input. The second embedding function $g(\bullet; w_M)$ takes as input a section of the Lidar intensity map 300, and produces the intensity map embedding 310 with the same number of channels as the online Lidar intensity embedding 308 and the spatial resolution of the map 300.

The GPS observation model encodes the likelihood of the GPS observation given a location proposal. The uncertainty of the GPS sensory observation is approximated using a Gaussian distribution:

$$P_{GPS} \propto \exp\left(-\frac{(g_x - x)^2 + (g_y - y)^2}{\sigma_{GPS}^2}\right)$$

where $g_x$ and $g_y$ represent the GPS observation converted from Universal Transverse Mercator (UTM) coordinates to map coordinates. $\sigma_{GPS}^2$ represents the variance of the GPS observations.

A vehicle motion model term $Bel_{t|t-1}$ encodes the fact that the inferred vehicle velocity should agree with the observed vehicle dynamics, given the prior belief from the previous time step, $Bel_{t-1}$. In particular, wheel odometry and IMU data are used as input to an extended Kalman filter to generate an estimate of the velocity of the vehicle. The motion model may be defined as:

$$Bel_{t-1}(x \mid X_t) = \sum_{x_{t-1} \in \mathcal{R}_{t-1}} P(x \mid X_t, x_{t-1}) Bel_{t-1}(x_{t-1})$$

where $$P(x \mid X_t, x_{t-1}) \propto \rho(x \ominus (x_{t-1} \oplus X_t))$$

with $\rho = \exp(-z^T \Sigma^{-1} z)$ is a Gaussian error function. $\Sigma$ is the covariance matrix. $\oplus$ and $\ominus$ represent the 2D pose composition and inverse pose composition operators, which are defined as $$a \oplus b = \begin{bmatrix} x_a + x_b \cdot \cos\theta_a - y_b \cdot \sin\theta_a \\ y_a + x_b \cdot \sin\theta_a + y_b \cdot \cos\theta_a \\ \theta_a + \theta_b \end{bmatrix}$$

$$a \ominus b = \begin{bmatrix} (x_a - x_b) \cdot \cos\theta_b + (x_a - y_b) \cdot \sin\theta_b \\ -(x_a - x_b) \cdot \sin\theta_b + (x_b - y_b) \cdot \cos\theta_b \\ \theta_a - \theta_b \end{bmatrix}$$

As noted above, the $f$ and $g$ functions may correspond to multi-layer fully convolutional neural networks. Consistent with some embodiments the $f$ and $g$ functions may correspond to a shallow matching network that uses instance normalization after each convolutional layer.

During operation of the AV system 100, the Lidar localizer 122 estimates the pose of the AV system 100 at each time step t by solving the following maximum a posteriori problem:

$$x_t^* = \arg\max_x Bel_t(x) = \arg\max_x \eta P_{Lidar}(I_t \mid x; M; w) P_{GPS}(G_t \mid x) Bel_{t|t-1}(x).$$

Those of ordinary skill in the art will understand that this is a complex non-linear and non-convex energy minimization problem over the continuous variable x. This type of problem is conventionally solved with non-linear iterative solvers, which are sensitive to initialization and easily fall into local minima. Furthermore, most conventional solvers have non-deterministic run times, which is problematic for safety-critical real-time applications such as autonomous vehicles.

Rather than relying upon these conventional methods, the Lidar localizer 122 computes x through a search-based method, which is a more efficient technique given the characteristics of the problem. To this end, the Lidar localizer 122 discretizes the 3D search space over x={x, y, θ} as a grid, and computes the term $Bel_t$ for every cell of our search space. The Lidar localizer 122 centers the search space at what is referred to as a dead reckoning pose, which represents the pose of the vehicle at time t estimated using IMU and wheel encoders. The search range is given by the maximum drift between the dead reckoning pose and the ground truth pose observed over the entirety of a comprehensive dataset. In this way, the Lidar localizer 122 accounts for the maximal IMU/odometry errors, while also being robust in cases where the map-based localization itself fails in previous frames.

The Lidar localizer 122 computes the inner product scores between two 2D deep embeddings across all translational positions in the (x, y) search range, which is equivalent to convolving the map embedding 310 with the online Lidar intensity embedding 308 as a kernel. This improves the computation speed of the search over x and y. As a result, the entire optimization of $P_{LiDAR}$ can be performed using $n_\theta$ convolutions and one soft argmax, where $n_\theta$ is the number of discretization cells in the rotation (θ) dimension. Soft argmax is used instead of standard argmax in order to achieve robustness to observation noise and produce smooth localization results. Soft argmax is defined as $$x_t^* = \frac{\sum_x Bel_t(x)^\alpha \cdot x}{\sum_x Bel_t(x)^\alpha},$$

where α represents a temperature hyper-parameter larger than 1. This produces an estimation which considers the uncertainty of the prediction at time t.

The dimensions of the online Lidar intensity embedding 308 are $W_O \times H_O \times C$, with $W_O \times H_O$ being the dimensions of the input online Lidar intensity image 302. In this way, the online Lidar intensity embedding 308 includes a C-dimensional embedding vector per each pixel. The dimensions of the map embedding 310 are $W_M \times H_M \times C$. The map embedding 310 covers all the possible regions that an online Lidar sweep may reach at the current step t. Thus, $(W_M, H_M) = (W_O + S_{lon}, H_O + S_{lat})$, where $S_{lon}$ and $S_{lat}$ are the longitudinal and lateral search ranges, expressed in pixels.

As a result, the Lidar localizer 122 need only execute the embedding networks once, rotate the computed online Lidar embedding 308 $n_\theta$ times, and convolve each rotation with the map embedding 310 to get the scores for all the pose hypotheses. Hence, the solution provided by the Lidar localizer 122 is therefore globally optimal over the discretized search space including both rotation and translation. The rotation of the online Lidar embedding 308 may be implemented using a spatial transformer. A spatial transformer module can compute affine warps and other transformations of 2D images using bilinear interpolation in a manner which is differentiable, thereby enabling end-to-end learning. The transformation applied by a spatial transformer is learnable, but is described as being fixed to the pre-determined rotations for ease of explanation.

To improve the speed of the convolutional matching implementation operation and to optimize the localization process for Graphics Processing Unit (GPU) implementations, the Lidar localizer 122 performs the convolution matching in the Fourier domain, as opposed to the spatial one. According to the convolution theorem: $f*g=F^{-1}(F(f) \odot F(g))$, where "*" denotes the convolution operation, "F" the Fourier transform of a signal, $F^{-1}$ its inverse Fourier transform, and "$\odot$" an element-wise product. Theoretically, this can reduce the run-time complexity of the convolution from $O(N^2)$ to $O(N \log N)$, which translates to massive improvements in terms of run time.

The Lidar localizer 122 is end-to-end differentiable thereby enabling it to learn all parameters jointly using back-propagation. Consistent with some embodiments, a simple cross-entropy loss may be used to train the Lidar localizer 122, without requiring any additional, potentially expensive terms, such as a reconstruction loss. The cross-entropy loss between the ground-truth position and the inferred score map may be defined as $\mathcal{L}=-\Sigma_i\, p_{i,gt} \log p_i$, where the labels $p_{i,gt}$ are represented as one-hot encodings of the ground truth position (e.g., a tensor with the same shape as the score map S, with a 1 at the correct pose and 0 everywhere else).

The Lidar localizer 122 is trained using training data constructed from localized data logs. Each data log includes information from a driving session of an AV system (e.g., AV system 100) through an environment and can range from a few minutes to a few hours. Each log includes information about maps used by the corresponding AV system and surrounding environments detected by on-vehicle sensor systems. The training data is generated based on known poses of AV systems indicated in the data logs.

Ground truth pose information is used to generate positive examples and the Lidar localizer 122 is trained to identify other poses as incorrect. For a given Lidar sweep, a data log indicates a ground truth location of the AV system in the map, which is considered a positive example that the Lidar localizer 122 is trained to identify. Every other shift around the ground truth pose is considered a negative example. That is, for each Lidar sweep, the training data includes a positive example (the ground truth pose) and multiple negative examples (incorrect pose estimates that are different than the ground truth pose). This is achieved implicitly by the cross-entropy loss described previously; the "1" in the ground truth score map represents the positive example, and everything else is considered a negative example. This allows the neural network to learn to localize with high precision because it learns to localize online sweeps at the correct location and is penalized for even one pixel of error. Essentially, the Lidar localizer 122 learns to identify reliable localization cues from online sweep data.

Figure 4:
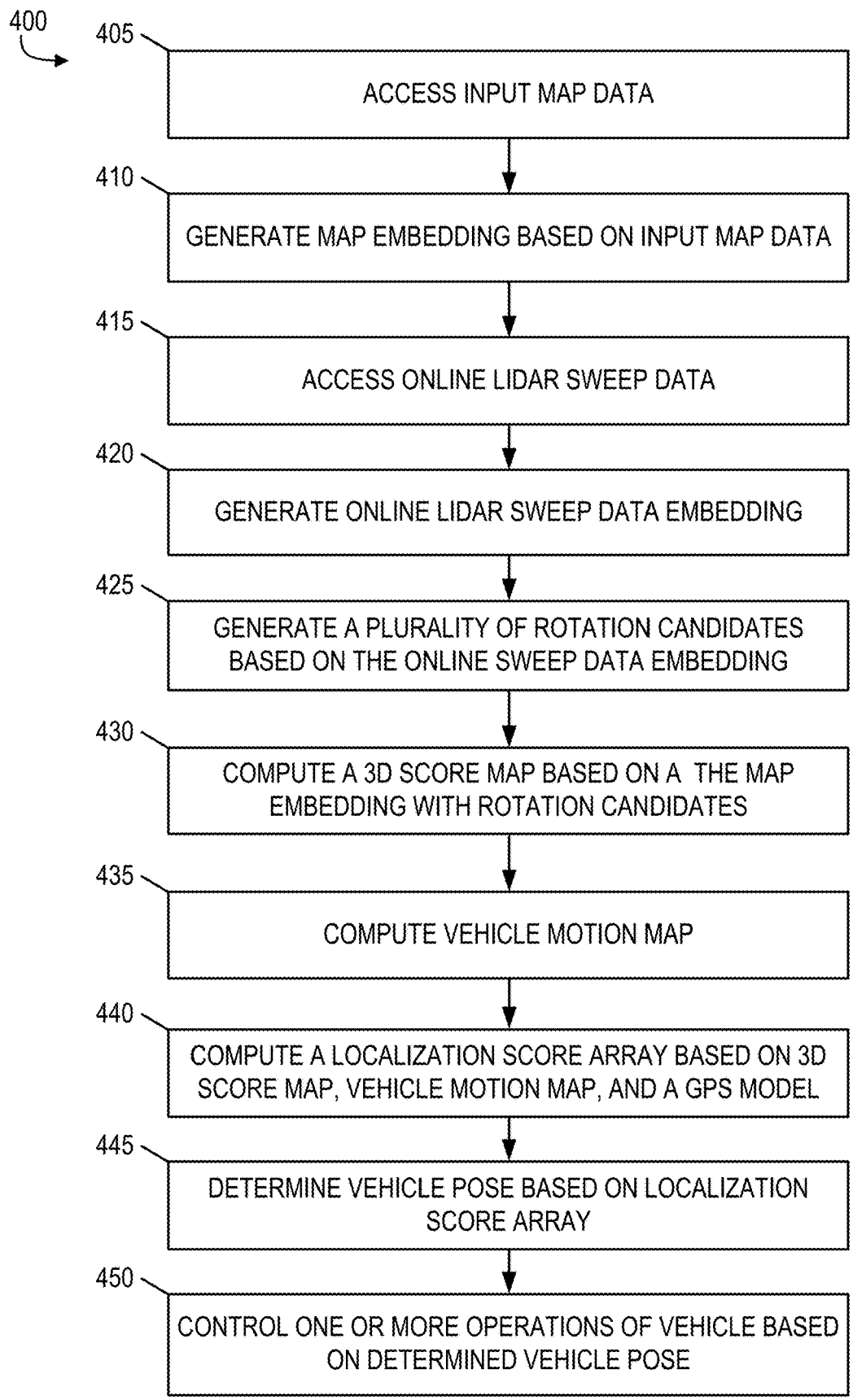
FIG. 4 is a flowchart illustrating example operations of the AV system in performing a method of localization using a Lidar intensity map, according to some embodiments.

FIG. 4 is a flowchart illustrating example operations of the AV system 100 in performing a method 400 of localization using a Lidar intensity map, according to some embodiments. The method 400 may be embodied in computer-readable instructions for execution by a hardware component (e.g., a processor) such that the operations of the method 400 may be performed by one or more components of the AV system 100. Accordingly, the method 400 is described below, by way of example with reference thereto. However, it shall be appreciated that the method 400 may be deployed on various other hardware configurations and is not intended to be limited to deployment on the vehicle computing system 102.

At operation 405, the Lidar localizer 122 accesses input map data (e.g., map data 124). The input map data comprises a pre-constructed Lidar intensity map (e.g., Lidar intensity map 300). The Lidar intensity map comprises a BEV map image that is encoded with Lidar intensity data. It may also include a height map which encodes the height of every pixel in the intensity image in some coordinate frame.

At operation 410, the Lidar localizer 122 generates an intensity map embedding based on the input map data. The intensity map embedding is a representation of the intensity encoded BEV map image computed using a first embedding function such as a neural network (e.g., a fully convolutional neural network). Accordingly, the Lidar localizer 122 may provide the input map data as input to a first neural network to compute the intensity map embedding. The first neural network may be trained to optimize the intensity map embedding facilitate efficient localization.

At operation 415, the Lidar localizer 122 accesses an online Lidar intensity image (e.g., online Lidar intensity image 302). The online Lidar intensity image data comprises point data output by the Lidar system 118 during operation of the AV system 100. More specifically, the online Lidar sweep data comprises a BEV projection of the K most recent Lidar point clouds. In instances where K>1, the online sweep data may be generated by aggregating multiple sweeps together using IMU and wheel odometry information.

At operation 420, the Lidar localizer 122 generates an online Lidar intensity embedding based on the Lidar intensity image. The online Lidar intensity embedding is a representation of the Lidar intensity image computed using a second embedding function such as a neural network (e.g., a fully convolutional neural network). Accordingly, the Lidar localizer 122 may provide the Lidar intensity image to a second neural network to compute the online Lidar intensity embedding. The second neural network is trained to optimize the representation of the online Lidar intensity image to make it efficient to match against. For example, the second neural network identifies reliable localization cues such as curbsides, buildings, poles and other fixed aspects of the surrounding environment. The second neural network further identifies unreliable localization cues in the online Lidar intensity image such as other vehicles and other dynamic objects and to mask out portions of the online Lidar intensity image in the embedding that correspond to the unreliable localization cues.

At operation 425, the Lidar localizer 122 generates a plurality of pose candidates based on the online Lidar intensity embedding. The Lidar localizer 122 generates the plurality of pose candidates by rotating the online Lidar intensity embedding no times.

At operation 430, the Lidar localizer 122 computes a three-dimensional (3D) score map based on a comparison of the intensity map embedding with each of the plurality of pose candidates. The 3D score map comprises a plurality of match scores and each match score corresponds to one of the plurality of pose candidates. Each match score indicates a degree of similarity between a pose candidate and the map embedding.

The Lidar localizer 122 computes the 3D score map by convolving each pose candidate with the map embedding. To improve the speed of the convolution operations, the Lidar localizer 122 may perform the convolution in a transform domain (e.g., Fourier domain).

At operation 435, the Lidar localizer 122 generates a vehicle motion model ($Bel_{t|t-1}$) based on the previous maximum a posteriori pose estimate ($x^*_{t-1}$), vehicle dynamics, and a previous time's belief ($Bel_{t-1}$). The vehicle motion model encodes an agreement between an inferred velocity and a velocity sensed by an inertial motion unit (IMU) and one or more wheel encoders.

At operation 440, the Lidar localizer 122 generates a localization score array based on the 3D score map. The Lidar localizer 122 may generate the localization score array by computing an element-wise product of the 3D score map with the vehicle motion model, and a GPS observation model $P_{GPS}$. The GPS observation model encodes an agreement between a hypothesized vehicle pose and a current GPS observation. The localization array generated as a result of applying the motion model and GPS observation model to the 3D score map is the same size and dimensions of the 3D score map.

At operation 445, the Lidar localizer 122 determines a vehicle pose of the AV system 100 based on the localization score array. The determined vehicle pose corresponds to soft argmax of the values in the $Bel_t$ array. Since each cell in the localization score array has three coordinates (x, y, θ) the determined vehicle pose comprises a three-degree-of-freedom (3DoF) pose. That is, the determined vehicle pose comprises a longitude, a latitude, and a heading.

At operation 450, the vehicle controller 114 controls one or more operations of the vehicle based on the determined vehicle pose. For example, the motion planning system 112 may determine a motion plan for the AV system 100 based on determined vehicle pose along with information provided by the perception system 108 and prediction system 110, and the vehicle controller 114 may control motion of the AV system 100 to follow the motion plan.

Figure 5:
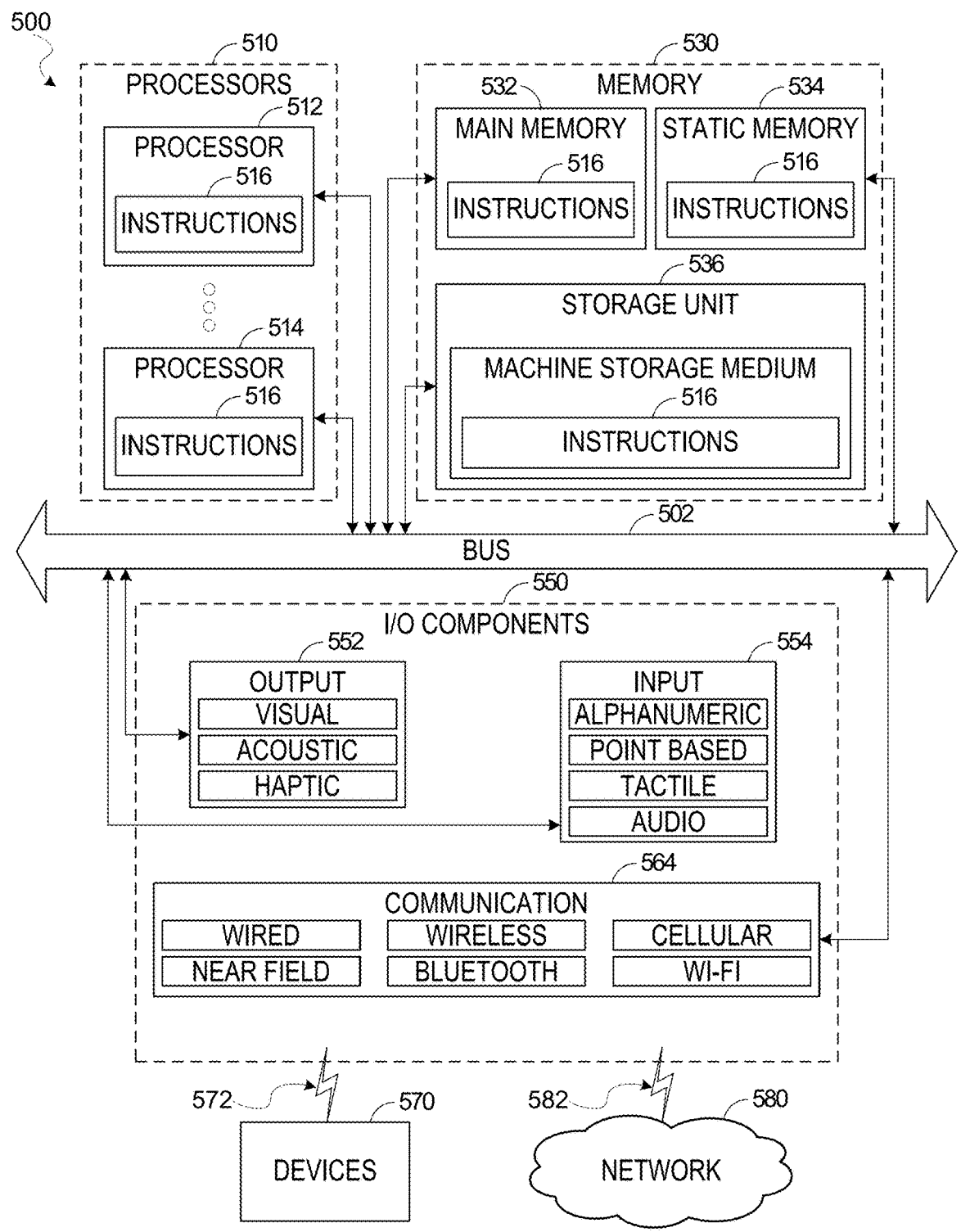
FIG. 5 is a diagrammatic representation of a machine in the example form of a computer system within which a set of instructions for causing the machine to perform any one or more of the methodologies discussed herein may be executed.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute the method 500. In this way, the instructions 516 transform a general, non-programmed machine into a particular machine 500, such as the vehicle computing system 102, that is specially configured to carry out the described and illustrated functions in the manner described here. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and input/output (I/O) components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 516. The term "processor" is intended to include multi-core processors 510 that may comprise two or more independent processors (sometimes referred to as "cores") that may execute instructions contemporaneously. Although FIG. 5 shows multiple processors 510, the machine 500 may include a single processor with a single core, a single processor with multiple cores (e.g., a multi-core processor), multiple processors with a single core, multiple processors with multiple cores, or any combination thereof.

The memory 530 may include a main memory 532, a static memory 534, and a storage unit 536, both accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include components to receive input, provide output, produce output, transmit information, exchange information, capture measurements, and so on. The specific I/O components 550 that are included in a particular machine 500 will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, and other communication components to provide communication via other modalities. The devices 570 may be another machine or any of a wide variety of peripheral devices (e.g., a peripheral device coupled via a universal serial bus (USB)).

Executable Instructions and Machine Storage Medium

The various memories (e.g., 530, 532, 534, and/or memory of the processor(s) 510) and/or the storage unit 536 may store one or more sets of instructions 516 and data structures (e.g., software) embodying or utilized by any one or more of the methodologies or functions described herein. These instructions, when executed by the processor(s) 510, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., hypertext transfer protocol (HTTP)). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. An autonomous vehicle (AV) system configured to control a vehicle, the system comprising:
    one or more processors of a machine; and
    a machine-storage medium storing instructions that, when executed by the one or more processors, cause the machine to perform operations comprising:
    generating, using a first embedding function, an intensity map embedding based on a Lidar intensity map, the Lidar intensity map comprising a map image encoded with Lidar intensity data, the intensity map embedding comprising a representation of the Lidar intensity map computed by the first embedding function, the map image comprising a birds-eye view (BEV) image of an environment;
    generating, using a second embedding function, an online Lidar intensity embedding based on an online Lidar intensity image, the online lidar intensity image comprising a BEV rasterized image generated by aggregating point data output by a Lidar system during operation of the vehicle, the aggregating using IMU data and wheel odometer read information, the online Lidar intensity embedding comprising a representation of the online Lidar intensity image computed by the second embedding function, the point data comprising multiple point clouds;
    transforming the online Lidar intensity embedding into a coordinate frame of the intensity map embedding;
    generating a plurality of pose candidates based on the online Lidar intensity embedding;
    computing a three-dimensional (3D) score map based on a comparison of the intensity map embedding with each pose candidate in the plurality of pose candidates, the 3D score map comprising a plurality of match scores, the plurality of match scores comprising a match score for a pose candidate in the plurality of pose candidates, the match score for the pose candidate indicating a similarity between the pose candidate and the map embedding;
    determining a pose of the vehicle based on the 3D score map, the pose of the vehicle corresponding to the pose candidate, the pose of the vehicle comprising a longitude, a latitude, and a heading; and
    controlling one or more operations of the vehicle based on the pose.

2. The AV system of claim 1, wherein the operations further comprise:
    computing a localization score array based on the 3D score map, the localization score array comprising a plurality of localization scores generated based on the plurality of match scores, the plurality of localization scores including a localization score for the pose candidate.

3. The AV system of claim 2, wherein the computing of the localization score array comprises computing an element-wise product of the 3D score map, a vehicle motion model, and a GPS observation model score map, the vehicle motion model encoding an agreement between an inferred velocity and a velocity sensed by an IMU and one or more wheel encoders, the GPS observation model score map encoding an agreement between a hypothesized vehicle pose and a current GPS observation.

4. The AV system of claim 3, wherein the operations further comprise computing the motion model based on a previous vehicle pose and vehicle dynamics.

5. The AV system of claim 2, wherein the determining of the pose of the vehicle is based on the localization score for the pose candidate.

6. The AV system of claim 1, wherein the second embedding function computes the representation of the online Lidar intensity image by performing operations comprising:
    identifying a portion of the online Lidar intensity image comprising one or more unreliable localization cues; and
    masking out the portion of the online Lidar intensity image comprising the one or more unreliable localization cues.

7. The AV system of claim 1, wherein the generating of the plurality of pose candidates based on the online Lidar intensity embedding comprises performing multiple rotations of the online Lidar intensity embedding.

8. The AV system of claim 1, wherein the computing of the 3D score map comprises convolving the intensity map embedding with each pose candidate in the plurality of pose candidates.

9. The AV system of claim 8, wherein the convolving of the intensity map embedding with each pose candidate comprises performing a convolution of the intensity map embedding with the online Lidar intensity image embedding for each pose candidate in a transformed domain.

10. The AV system of claim 1, wherein the Lidar intensity map further includes a height map containing a height of each point in the Lidar intensity map with respect to a coordinate frame.

11. A method comprising:
generating, using a first neural network, an intensity map embedding based on a Lidar intensity map, the Lidar intensity map comprising a map image encoded with Lidar intensity data, the intensity map embedding comprising a representation of the Lidar intensity map computed by the first neural network, the map image comprising a birds-eye view (BEV) image of an environment;
generating, using a second neural network, an online Lidar intensity embedding based on an online Lidar intensity image, the online lidar intensity image comprising a BEV rasterized image generated by aggregating point data output by a Lidar system during operation of a vehicle, the aggregating using IMU data and wheel odometer read information, the online Lidar intensity embedding comprising a representation of the online Lidar intensity image computed by the second neural network;
transforming the online Lidar intensity embedding into a coordinate frame of the intensity map embedding;
generating a plurality of pose candidates based on the online Lidar intensity embedding;
computing a three-dimensional (3D) score map based on a comparison of the intensity map embedding with each pose candidate in the plurality of pose candidates, the 3D score map comprising a plurality of match scores, the plurality of match scores comprising a match score for a pose candidate in the plurality of pose candidates, the match score for the pose candidate indicating a similarity between the pose candidate and the intensity map embedding;
determining a pose of the vehicle based on the 3D score map, the pose of the vehicle corresponding to the pose candidate, the pose of the vehicle comprising a longitude, a latitude, and a heading; and
controlling one or more operations of the vehicle based on the determined pose.

12. The method of claim 11, further comprising:
computing a localization score array based on the 3D score map, the localization score array comprising a plurality of localization scores generated based on the plurality of match scores, the plurality of localization scores including a localization score for the pose candidate.

13. The method of claim 12, wherein the computing of the localization score array comprises computing an element-wise product of the 3D score map, a vehicle motion model, and a GPS observation model score map, the vehicle motion model encoding an agreement between an inferred velocity and a velocity sensed by an IMU and one or more wheel encoders, the GPS observation model score map encoding an agreement between a hypothesized vehicle pose and a current GPS observation.

14. The method of claim 12, wherein the determining of the pose of the vehicle is based on the localization score for the pose candidate.

15. The method of claim 11, wherein the second neural network computes the representation of the online Lidar intensity image by performing operations comprising:
identifying a portion of the online Lidar intensity image comprising one or more unreliable localization cues; and
masking out the portion of the online Lidar intensity image comprising the one or more unreliable localization cues.

16. The method of claim 11, wherein the generating of the plurality of pose candidates based on the online Lidar intensity embedding comprises performing multiple rotations of the online Lidar intensity embedding.

17. The method of claim 11, wherein the computing of the 3D score map comprises convolving the intensity map embedding with each pose candidate in the plurality of pose candidates.

18. A machine-storage medium storing instructions that, when executed by one or more processors, cause the one or more processors to perform operations comprising:
generating, using a first neural network, an intensity map embedding based on a Lidar intensity map, the Lidar intensity map comprising a map image encoded with Lidar intensity data, the intensity map embedding comprising a representation of the Lidar intensity map computed by the first neural network, the map image comprising a birds-eye view (BEV) image of an environment;
generating, using a second neural network, an online Lidar intensity embedding based on an online Lidar intensity image, the online lidar intensity image comprising a BEV rasterized image generated by aggregating point data output by a Lidar system during operation of a vehicle, the aggregating using IMU data and wheel odometer read information, the online embedding comprising a representation of the online Lidar intensity image computed by the second neural network;
transforming the online Lidar intensity embedding into a coordinate frame of the intensity map embedding;
generating a plurality of pose candidates based on the online Lidar intensity embedding;
computing a three-dimensional (3D) score map based on a comparison of the map embedding with each pose candidate in the plurality of pose candidates, the 3D score map comprising a plurality of match scores, the plurality of match scores comprising a match score for a pose candidate in the plurality of pose candidates, the match score for the pose candidate indicating a similarity between the pose candidate and the map embedding;
determining a pose of the vehicle based on the 3D score map, the pose of the vehicle corresponding to the pose candidate, the pose of the vehicle comprising a longitude, a latitude, and a heading; and
controlling one or more operations of the vehicle based on the determined pose.

19. The AV system of claim 1, the operations further comprising generating an online Lidar intensity image at least in part by aggregating multiple point clouds using inertial measurement unit (IMU) data and wheel odometry information, the multiple point clouds being from an online Lidar intensity image comprising point data output by a Lidar system during operation of the vehicle.

20. The method of claim 11, further comprising generating an online Lidar intensity image at least in part by aggregating multiple point clouds using inertial measurement unit (IMU) data and wheel odometry information, the multiple point clouds being from an online Lidar intensity image comprising point data output by a Lidar system during operation of the vehicle.

* * * * *